US 6,665,020 B1

(12) United States Patent
Stahl et al.

(10) Patent No.: US 6,665,020 B1
(45) Date of Patent: Dec. 16, 2003

(54) DIGITAL TELEVISION APPARATUS FOR CONTROLLING A PERIPHERAL DEVICE VIA A DIGITAL BUS

(75) Inventors: Thomas Anthony Stahl, Indianapolis, IN (US); Steven Charles Rhoads, Carmel, IN (US); Mike Arthur Derrenberger, Fishers, IN (US); Izzat Hekmat Izzat, Carmel, IN (US); Saban Kurugay, Waukesha, WI (US); Amit Kumar Chatterjee, North Andover, MA (US); Sanjeev Nagpal, Longmont, CO (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/508,922

(22) PCT Filed: Sep. 18, 1998

(86) PCT No.: PCT/US98/19631

§ 371 (c)(1),
(2), (4) Date: Sep. 13, 2000

(87) PCT Pub. No.: WO99/14946

PCT Pub. Date: Mar. 25, 1999

Related U.S. Application Data

(60) Provisional application No. 60/071,341, filed on Jan. 14, 1998, provisional application No. 60/066,782, filed on Nov. 25, 1997, and provisional application No. 60/058,507, filed on Sep. 11, 1997.

(51) Int. Cl.[7] .................................................. H04N 7/00

(52) U.S. Cl. ........................ 348/552; 725/80; 710/107

(58) Field of Search ................................ 710/104, 105, 710/107, 110, 305, 117, 8, 15; 345/723; 348/460, 552, 734, 569; 725/38, 80

(56) References Cited

U.S. PATENT DOCUMENTS

| 5,488,357 | A | | 1/1996 | Sato et al. | |
|---|---|---|---|---|---|
| 5,499,018 | A | | 3/1996 | Welmer | |
| 5,608,730 | A | | 3/1997 | Osakabe et al. | |
| 5,617,330 | A | | 4/1997 | Stirling | |
| 5,787,259 | A | * | 7/1998 | Haroun et al. | 348/552 |
| 5,794,118 | A | * | 8/1998 | Yoshinobu | 455/5.1 |
| 5,844,623 | A | * | 12/1998 | Iwamura | 348/553 |
| 5,936,667 | A | * | 8/1999 | Saib | 348/180 |
| 6,003,065 | A | * | 12/1999 | Yan et al. | 709/201 |
| 6,313,880 | B1 | * | 11/2001 | Smyers et al. | 348/552 |
| 6,370,322 | B2 | * | 4/2002 | Horiguchi et al. | 386/95 |
| 6,381,697 | B1 | * | 4/2002 | Kawamura | 213/162 |
| 6,421,069 | B1 | * | 7/2002 | Ludtke et al. | 345/762 |
| 6,442,630 | B1 | * | 8/2002 | Takayama et al. | 710/105 |
| 2001/0012447 | A1 | * | 8/2001 | Horiguchi | 386/125 |

FOREIGN PATENT DOCUMENTS

| EP | 0849884 | 6/1998 | ............ H04B/1/20 |
|---|---|---|---|
| EP | 0873009 | 10/1998 | ............ H04N/5/00 |

OTHER PUBLICATIONS

International Search Report dated Dec. 18, 1998.

* cited by examiner

Primary Examiner—Victor R. Kostak
(74) Attorney, Agent, or Firm—Joseph S. Tripoli; Paul P. Kiel

(57) ABSTRACT

A minimal level of interoperability for exchanging audio/video (A/V) content and associated control between common consumer electronic (CE) devices is defined. This interoperability is based on the IEEE 1394 serial bus for the physical and link layers and makes use of AV/C or CAL as the control language. This invention provides for reducing the number of remote controls that the user might need by allowing remote control commands to always be received by a controlling device (e.g., digital television) and then routed to the appropriate peripheral device (e.g. digital VCR) after translation into a universal format.

12 Claims, 5 Drawing Sheets

DIGITAL TELEVISION APPARATUS FOR CONTROLLING A PERIPHERAL DEVICE VIA A DIGITAL BUS

This application claims the benifit of provisional applications. 60/058,507 filed Sep. 11, 1997, Ser. No. 60/066,782 filed Nov. 25, 1997 and Ser. No. 60/071,341 filed Jan. 14, 1998.

FIELD OF THE INVENTION

The invention involves a system for controlling multiple electronic devices, such as consumer electronic devices or the like, via interconnections such as digital data buses. More particularly, this invention concerns an arrangement for managing the interoperability of such devices.

BACKGROUND OF THE INVENTION

A data bus can be utilized for interconnecting electronic devices such as television receivers, display devices, videocassette recorders (VCR), direct broadcast satellite (DBS) receivers, and home control devices (e.g., a security system or a temperature control device). Communication using a data bus occurs in accordance with a bus protocol. Examples of bus protocols include the Consumer Electronics Bus (CEBus) and the IEEE 1394 High Performance Serial Bus.

A bus protocol typically provides for communicating both control information and data. For example, CEBus control information is communicated on a "control channel" having a protocol defined in Electronics Industries Association (EIA) specification IS-60. On an IEEE 1394 serial bus, control information is generally passed using the asynchronous services of the serial bus. Control information for a particular application can be defined using for example, Common Application Language (CAL) or AV/C.

Today, most A/V devices are controlled with a remote control (RC) unit. The actual direct or physical link may be implemented with infrared (IR), ultrasound (US) or radio-frequency transmission (RF). The protocol between the peripheral device and the RC unit is device specific such that each device comes with its own RC unit. Each such peripheral device interprets the key presses it receives via its direct link and carries out the corresponding actions. Thus in the case of IR, control of a peripheral or target device is limited to a direct line-of-sight between the RC unit and the peripheral device.

In today's analog audio/video (A/V) cluster, controlling peripheral devices may include, but do not require, the activation of an On-Screed Display (OSD) mechanism on a display device (i.e., TV). The OSD of such AN devices is generated in the peripheral or target device (e.g., digital VCR) and is output on the NTSC output of such devices the same way as any other video signal. Thus, no additional hardware or software is needed in either the peripheral or the display device. FIG. 1 illustrates a present A/V system 10 having a VCR 12 and a display device 14 (e.g., television) that employs such a control methodology. Menus associated with controlling VCR 12 are generated by the VCR 12 and are provided to the display device 14 via the NTSC output of the VCR 12 as a composite video. Unfortunately, to use the same approach (See FIG. 2) with a digital TV (DTV) as a display device 14' is not practical since it would require the menus to be transported as MPEG-2 transport streams. Generation of such streams necessitates integrating an MPEG encoder 15' into all peripheral devices which greatly increases the cost and complexity of such consumer electronic devices.

SUMMARY OF THE INVENTION

The present invention provides for a minimal level of interoperability for exchanging audio/video (A/V) content and associated control between common consumer electronic (CE) devices. The interface is based on IEEE 1394 serial bus for the physical and link layers and makes use of a control language such as AV/C or CAL for managing OSDs and controlling the connectivity of devices interconnected via a digital serial bus. Particularly, this invention provides for reducing the number of remote controls that the user might need by allowing remote control commands to always be received by a controlling device (e.g., digital television or DTV) and then routed to the appropriate peripheral device after translation into a universal format. A universal remote message is carried across the serial bus and permits complex applications such as allowing the user to select a program to be recorded using the EPG of the DTV.

Although it will be possible to control each CE device through its own front panel or its own remote control, it is recognized that it is highly desirable to control all devices on the cluster with one remote control. One way to achieve this goal in a wav that furthers interoperability is to use a standard control language (e.g., CAL or AV/C) to carry universal remote control messages across the bus. This would also allow the control of devices which are not directly in the line-of-sight (e.g., devices in a different room or hidden, for example behind a cabinet door) as long as they are on the IEEE 1394 serial bus. Once the user has the peripheral device's menu displayed on a display device, the display device can relay user initiated commands (i.e., remote control (RC) keystrokes) intended for the peripheral device, received via any appropriate link (for example, IR link). The remote control kevs would be mapped to a common command language, which all consumer electronic devices from any manufacturer would be compliant with, before they are transferred.

BRIEF DESCRIPTION OF THE DRAWINGS

The invention may be better understood by referring to the enclosed drawing in which:

FIG. 5 shows, in simplified schematic block-diagram form, the interoperability of digital devices employing the present invention; and In the drawing, reference numerals that are identical in different figures indicate features that are the same or similar.

DETAILED DESCRIPTION OF THE DRAWINGS

The use of IEEE 1394 serial bus has been suggested for many applications within a Home Network environment. It is being discussed within Video Electronics Standards Association (VESA) for use as a "whole home network." It is being built into the next generation PCs and will be used for many local peripherals including disc drives. Further, digital audio/video consumer electronic devices such as digital televisions (DTVs) and digital video cassette recorders (DVHS) may utilize a serial bus for interconnecting these devices.

Figure 1:
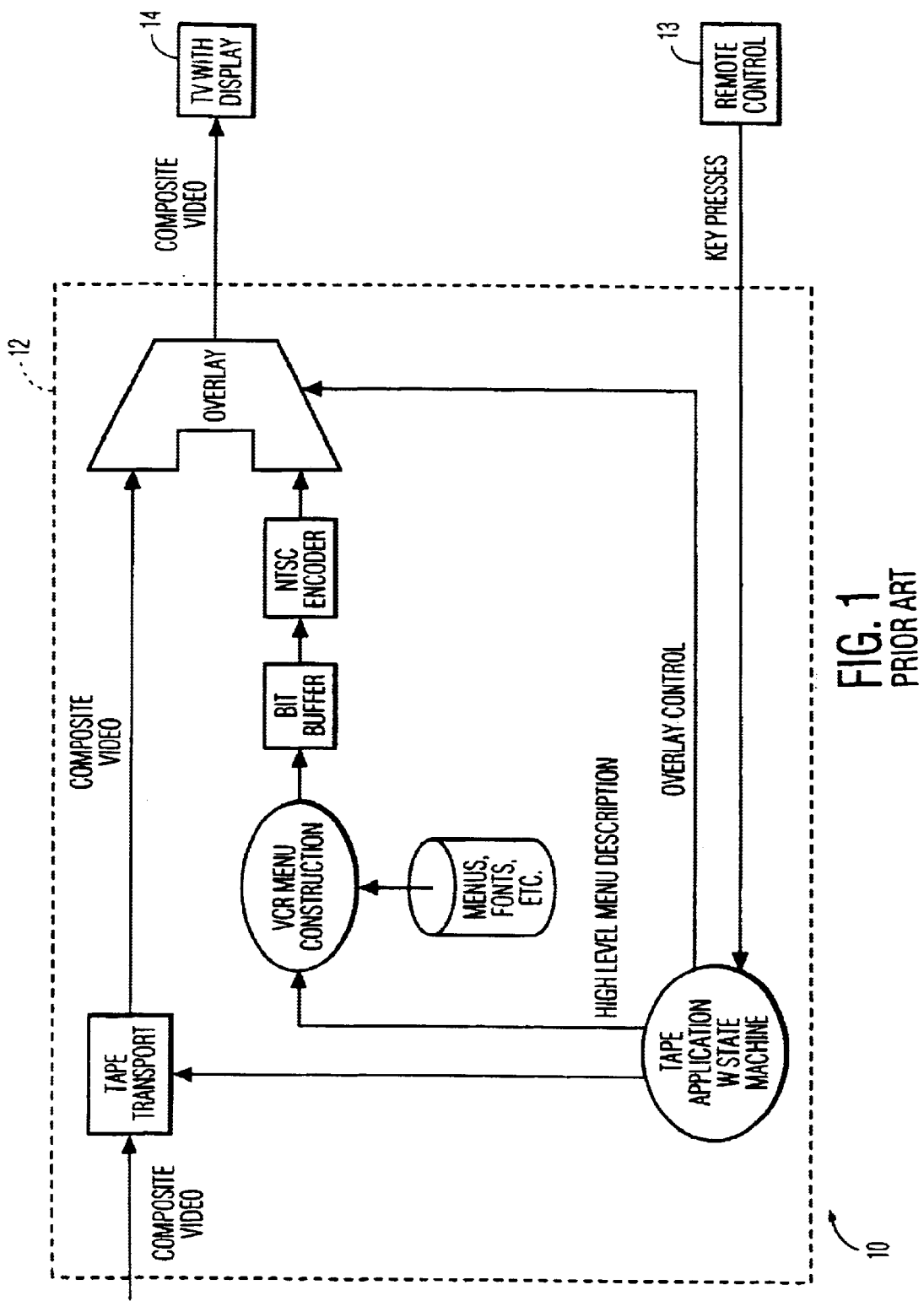
FIG. 1 shows, in simplified block-diagram form, the interoperabilitv of a prior art audio/video system.
Figure 2:
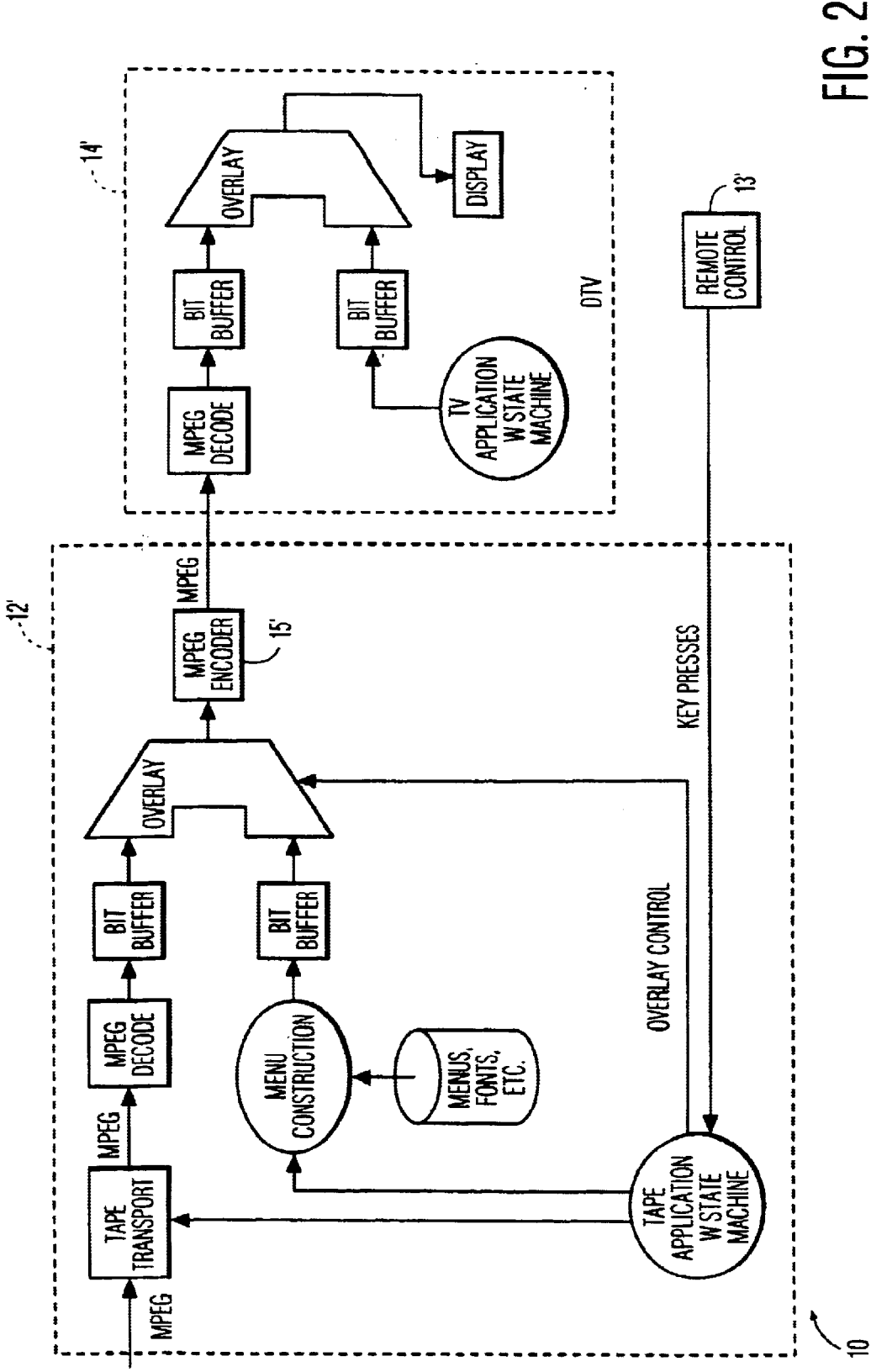
FIG. 2 shows, in simplified block-diagram form, the extension of the prior art interoperability between a digital VCR and a digital television.
Figure 3:
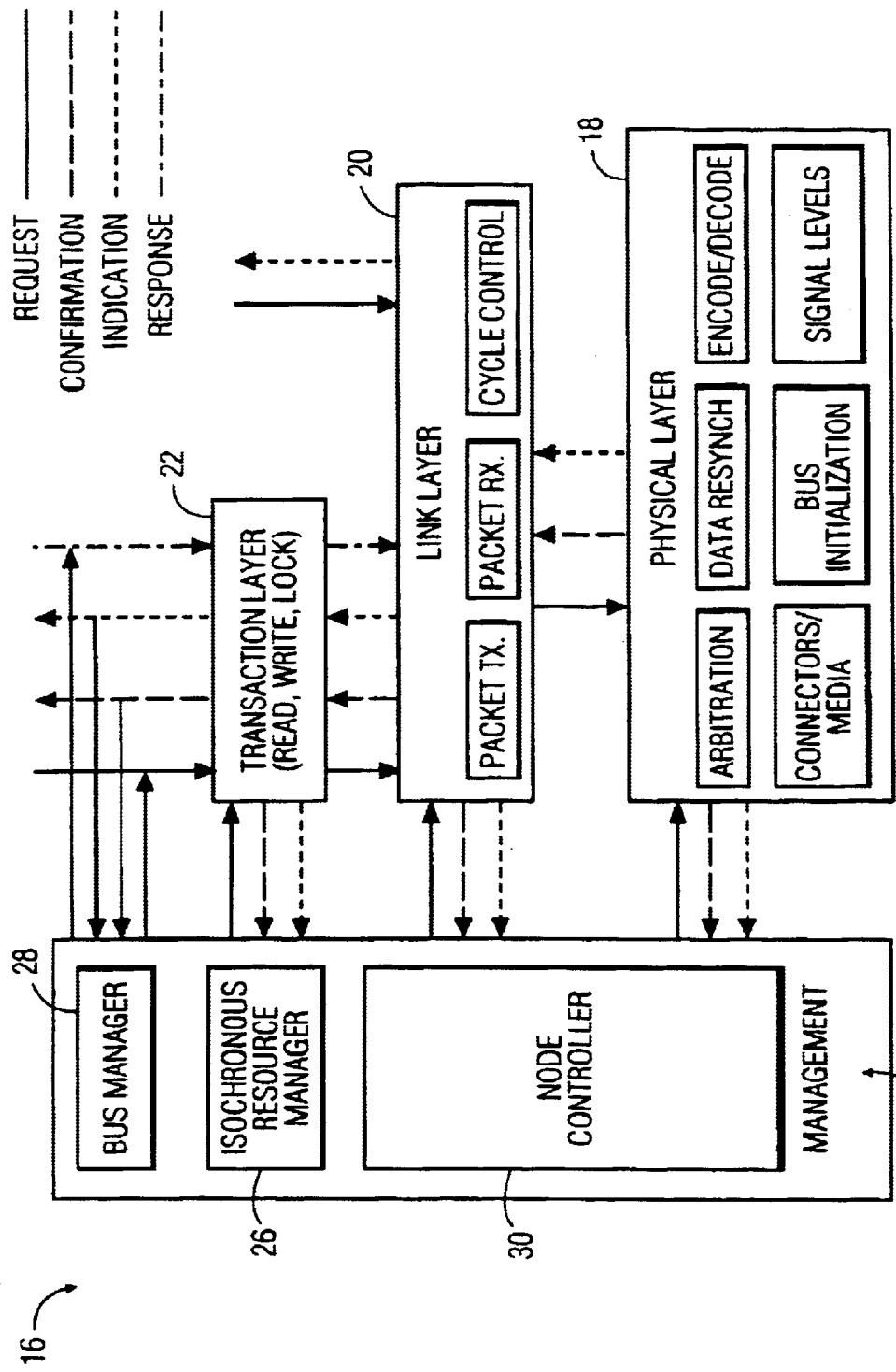
FIG. 3 is a simplified schematic block diagram illustrating the IEEE 1394 serial bus protocol.

IEEE-1394 is a high speed, low cost digital serial bus developed for use as a peripheral or back-plane bus. Some of the highlights of the bus include: dynamic node address assignments, data rates of 100, 200, and 400 Mbits/sec, asynchronous and isochronous modes, fair bus arbitration, and consistency with ISO/IEC 13213. FIG. 3 illustrates the serial bus protocol for the IEEE 1394 serial bus 16 as a set of three stacked layers.

The physical layer 18 consists of the physical signaling circuits and logic that are responsible for power-up initialization, arbitration, bus-reset sensing, and data signaling. Two shielded low-voltage differential signal pairs, plus a power pair are defined for the IEEE-1394 serial cable. Signaling is done by using data-strobe bit level encoding which doubles jitter tolerance.

Data is formatted into packets in the link layer 20. Two classes of data communication between devices are supported: asynchronous and isochronous. Asynchronous communication can be characterized as "allows acknowledgment," while isochronous communication can be characterized as "always on time." The asynchronous service will be used primarily for control and status messages while isochronous communication will be used for data streams such as MPEG video. The timely nature of isochronous communication is achieved by providing a cycle every 125 μsec. Isochronous cycles take priority over asynchronous communication.

Asynchronous transfer can take place any time the bus is free. A minimum of 25 μsec out of every 125 μsec cycle is reserved for asynchronous data transfer. Isochronous transfer provides a real-time data transfer mechanism. An ongoing isochronous communication between one or more devices is referred to as a channel. The channel has to be established first, then the requesting device is guaranteed to have the requested amount of bus time every cycle.

The transaction layer 22 defines a complete request-reply protocol to perform bus transactions. Although transaction layer 22 does not add any services for isochronous data transfer, it does provide a path for management of the resources needed for isochronous services. This is done through reads and writes to the control status registry (CSR). Transaction layer 22 also defines a retry mechanism to handle situations where resources are busy and unable to respond. Asynchronous data is transferred between IEEE-1394 nodes utilizing one of three transactions; "read-data" for retrieving data from a different node, "write-data" for transferring data to a different node and "lock-data" for transferring data to a different node for processing and then the data is returned back to the original node.

Serial bus management 24 describes the protocols, services, and operating procedures whereby one node is selected and may then exercise management level control over the operation of the remaining nodes on the bus. There are two management entities defined for IEEE-1394 serial bus; the isochronous resource manager 26 and the bus manager 28. These two entities may reside on two different nodes or on the same node. A separate bus manager 28 may be absent from the bus. In this circumstance, the isochronous resource manager 26 exercises a subset of the management responsibilities normally assumed by the bus manager 28. The bus manager 28 provides a number of services including; maintenance of the speed and topological map, and bus optimization. The isochronous resource manager 26 provides facilities for allocation of isochronous bandwidth, allocation of channel numbers, and the selection of the cycle master.

Node control is required at all nodes: node controller 30 implements the CSRs required by all serial bus nodes and communicates with the physical 18, link 20, and transaction 22 layers and any application present in the device. Node controller 30 component as well as CSR and configuration ROM facilities are used to configure and manage the activities at an individual node.

For the IEEE 1394 serial bus to function properly, an isochronous resource manager (IRM) and a bus manager (BM) will be needed. Since most clusters (i.e., devices interconnected via a digital bus) will include a display device of some kind, it should be required that a Set Top Box with Analog Display and DTV must be IRM and BM capable. In some cases, such as an all audio cluster, a display device may not be present. In this case, it should also be required that a Digital Audio Amp be IRM and BM capable.

IRM 26 provides the resources necessary for the serial bus to cooperatively allocate and de-allocate the isochronous resources, (channels and bandwidth), required for orderly isochronous operations. IRM 26 provides a common location for the other nodes. to check on availability of channels and bandwidth, and to register their new allocations. IRM 26, whose location is known immediately upon completion of the self identify, process, also provides a common location where serial bus nodes may determine the identity of BM 28, if one is present.

BM 28, if present, provides management services to other nodes on the serial bus. These include activation of a cycle master, performance optimization, power management, speed management and topology management.

Functional Control Protocol (FCP) is designed in order to control devices connected through an IEEE-1394 bus. FCP uses the IEEE-1394 asynchronous write packet for sending commands and responses. The IEEE-1394 asynchronous packet structure with FCP embedded in the data field shown below. The Command/Transaction SET (CTS) specifies the command set (e.g. AV/C, CAL). It also allows a vendor unique set to be encapsulated in the packet.

| FCP Frame in the payload of an asynchronous write | | | | |
|---|---|---|---|---|
| Destination ID Source ID | TI | Rt | 0001 | Pri |
| | Destination offset | | | |
| Data Length | | | Extended tcode | |
| | Header CRC | | | |
| CTS | | | | |
| | Zero pad bytes (if necessary) | | | |
| | Data CRC | | | |

FCP frames are classified as command frames, and response frames. The command frame is written into a command register on a peripheral and the response frame is written into a response register on a controlling device. The standard specifies two addresses for the command and the response.

The structure of the isochronous packet in IEC-61883 is shown below. The packet header is composed of two quadlets of an IEEE-1394 isochronous packet. (A quadlet is four 8-bit bytes.) The Common Isochronous Packet (CIP) header is placed at the beginning of the data field of an IEEE-1394 isochronous packet, immediately followed by the real time data.

| Data Length | Tag | Channel | Tcode | Sy |
|---|---|---|---|---|
| | | Header CRC | | |
| | | CIP Header | | |
| | | Real Time Data | | |
| | | Data CRC | | |

Data length is the data field length in bytes, Tag indicates whether CIP exist (01) or not (00), Channel specifies the isochronous channel number, Tcode=1010, and Sy is an application specific control field.

The 61883 standard defined a generic format for consumer A/V transmission. This format has a two quadlet header as shown below. In the table, SID is Source node_ID, DBS is data block size in quadlets, Fraction Number (FN) allow you to divide source packets for bus time utilization, Quadlet Padding Count (QPC) indicates number of quadlets count, Source Packet Header (SPH) is a flag to indicate whether the packet has a source packet header, rsv indicates reserved for future, Data Block Counter (DBC) is a continuity counter, FMT indicates the format ID such as MPEG2, DVCR, and Format Dependent field (FDF) is format ID specific.

| 0 | 0 | SID | DBS | FN | QPC | SPH | rsv | DBC |
|---|---|---|---|---|---|---|---|---|
| 1 | 0 | FMT | | | | FDF | | |
| | | Reserved | | | | time stamp | | |

The concept of plugs and plug control registers is used to start and stop isochronous data flows on the bus and to control their attributes. Plug control registers are special purpose CSR registers. The set of procedures that use the plug control registers to control an isochronous data flow are called Connection Management Procedures (CMP).

Isochronous data flows from one transmitting device to zero or more receiving devices by sending the data on one isochronous channel on the IEEE-1394 bus. Each isochronous data flow is transmitted to an isochronous channel through one output plug on the transmitting device and is received from the isochronous channel through one input plug on each of the receiving devices.

The transmission of an isochronous data flow through an output plug is controlled by one output Plug Control Register (oPCR) and one output Master Plug Register (oMPR) located on the transmitting device. oMPR controls all common isochronous data flow attributes while oPCR controls all other attributes. Similar registers (iPCR, and iMPR) exist for the reception of isochronous data. There is only one oMPR (iMPR) for all output plugs (input plugs). The contents of oMPR (iMPR) includes; data rate capability and number of plugs among others. oMPR (iMPR) contains a connection counter, channel number, and data rate among others.

There are a number of management procedures for each connection type that allows an application to establish a connection, overlaying a connection, and breaking a connection. These procedures involve allocation of IEEE-1394 resources, setting appropriate values into the plug control registers, reporting possible failure conditions to the application, and managing connections after a bus reset. One such CMP follows.

To transport isochronous data between two A/V devices on a IEEE 1394 serial bus, it is necessary to connect an output plug on the transmitting device to an input plug on the receiving device using one isochronous channel. The relationship between one input plug, one output plug and one isochronous channel is called a point-to-point connection. Similarly there are broadcast-out connections (one output plug and one isochronous channel) and broadcast-in connections (one input plug and one isochronous channel).

The flow of isochronous data is controlled by one output plug control register (oPCR) and one output master plug register (oMPR) located on the transmitting side. oMPR controls all the attributes (e.g. data rate capability, broadcast channel base etc.) that are common to all isochronous flows transmitted by the corresponding A/V device.

The reception of an isochronous data flow through an input plug is controlled by one input plug control register (iPCR) and one input master plug register (iMPR) located in the receiving device. iMPR controls all the attributes (e.g. data rate capability etc.) that are common to all isochronous data flows received by the corresponding device.

The major steps involved in establishing a connection are allocation of IEEE 1394 resources (e.g. bandwidth) and setting channel, data-rate, overhead-ID and connection counter in oPCR and iPCR.

An isochronous data flow can be controlled by any device connected to the IEEE 1394 serial bus by modifying the corresponding plug control registers. Although Plug control registers can be modified by asynchronous transactions on IEEE 1394 serial bus, the preferred method of connection management is through the use of AV/C. It is fully within the scope of this invention to employ CAL for connection management.

Application Control Languages

In order for a consumer electronic device to interact with other devices interconnected via a IEEE 1394 serial bus, a common product mode and common set of commands must be defined. Three standard approaches for device modeling and control are CAL, AV/C and the approach adopted for the Universal Serial Bus (USB).

CAL and AV/C are control languages that distinguish between logical and physical entities. For example, a television (i.e., a physical entity) may have a number of functional components (i.e., logical entities) such as a tuner, audio amplifier, etc. Such control languages provide two main functions: Resource allocation and Control. Resource allocation is concerned with requesting, using and releasing Generic Network resources. Messages and control are transported by the FCP as defined in IEC-61883 and discussed above. For example, CAL has adopted an object base methodology for its command syntax. An object contains and has sole access to a set number of internal values known as instance variables (IV). Each object keeps an internal list of methods. A method is an action that an object takes as a result of receiving a message. When a method is invoked, one or more IVs are usually updated. A message consists of a method identifier followed by zero or more parameters. When an object receives a method, it looks through its list of methods for one which matches the method identified in the message. If found, the method will be executed. The parameters supplied with the message determine the exact execution of the method.

The design of control languages is based on the assumption that all consumer electronic products have a hierarchical structure of common parts or functions. For example, CAL treats each product as a collection of one or more of these common parts called Contexts. These contexts are designed to allow access to product functionality in a uniform way. The context data structure is a software model defined in each device that models the operation of all device functions.

A context consists of one or more objects grouped together to form a specific functional sub-unit of a device. Like an object, context is a model of a functional sub-unit. Devices are defined by one or more contexts. CAL has defined a large set of contexts to model various types of consumer electronic devices. Each context, regardless of what product it is in, operates the same way.

Objects are defined by a set of IVs, for example the IVs for a binary switch object contain required and optional IVs. Required IVs include a variable (current_position) that indicates whether the switch is on or off and the default position (default_position) of the switch. Optional IVs include function_of_positions; reporting_conditions; dest_address; previous_value and report_header. IVs are just like variables in any software program and are supported in CAL as Boolean, Numeric, Character, and Data (array). The IVs in an object can be categorized into three general groups: support IVs, reporting IVs, and active IVs. The support IVs are usually read only variables that define the installation use of the object and operation of the active IVs. Active IVs of an object are the variables that are primarily set or read to operate the object.

The interaction between a controlling device (e.g., DTV) and peripheral device (e.g. DVHS) can mainly be divided into two major categories:

i) A machine-machine interaction where both controlling device and peripheral are machines. It is important to note that for this type of interaction, there is no user initiation at the time of the actual interaction. However, it is possible that the user preprogrammed the controlling device to carry a specific action at a specific point in time.

ii) A user-machine interaction where a human is initiating actions on the controlling device.

The primary means of user-machine input for analog audio/video devices (A/V) today is the use of a remote control (RC) unit or the front panel. Some of the interaction may also make use of an on-screen display (OSD) mechanism. In this kind of interaction, the user interacts directly with the peripheral. In the case of today's remote controls, the messaging protocol used is device and/or manufacturer specific. The peripheral device processes the received commands and carries out the required actions. If an OSD is used, this includes keeping track of the RC keys processed and updating the displayed OSD accordingly after each keypress. Currently there is no standard messaging protocol. This leads to the use of multiple remote control units (i.e., different RC units for the TV, VCR, etc.). The available universal remote controllers on the market have limited capability. These devices typically change their message format depending on which "device focus" button has been pressed.

The present invention gives the users the capability to interact with the A/V devices interconnected via a IEEE 1394 serial bus in a manner to which they are accustomed (i.e. use of an RC unit possibly in connection with an OSD). That is, a base level of interoperability between devices from different manufacturers at a minimal cost is established. Defining a standard messaging mechanism to allow for the transport of RC key presses to other units via the IEEE 1394 serial bus allows for the use of the RC unit associated with the controlling device (e.g., DTV) as a truly universal RC unit.

In operation, the user will choose, via the DTV, a video source (i.e., peripheral) device such as a DVCR. Once the peripheral device is chosen, the DTV sets up a connection to receive a digital A/V program (typically over an isochronous channel) and an OSD (typically over the asynchronous link). The user may then "focus" the remote control (RC) unit on the DVCR by pressing the VCR button. Now, for subsequent RC button pushes, the DTV will receive the RC key presses since the DTV understands the format of the RC modulation and data format. The DTV knows that the RC keypress is intended for the DVCR and not the DTV. The DTV will then translate the RC key press to a predetermined standardized universal key code and transport it across the serial bus to the DVCR. The DVCR will receive the standardized universal key code and will then perform the desired action.

Figure 4:
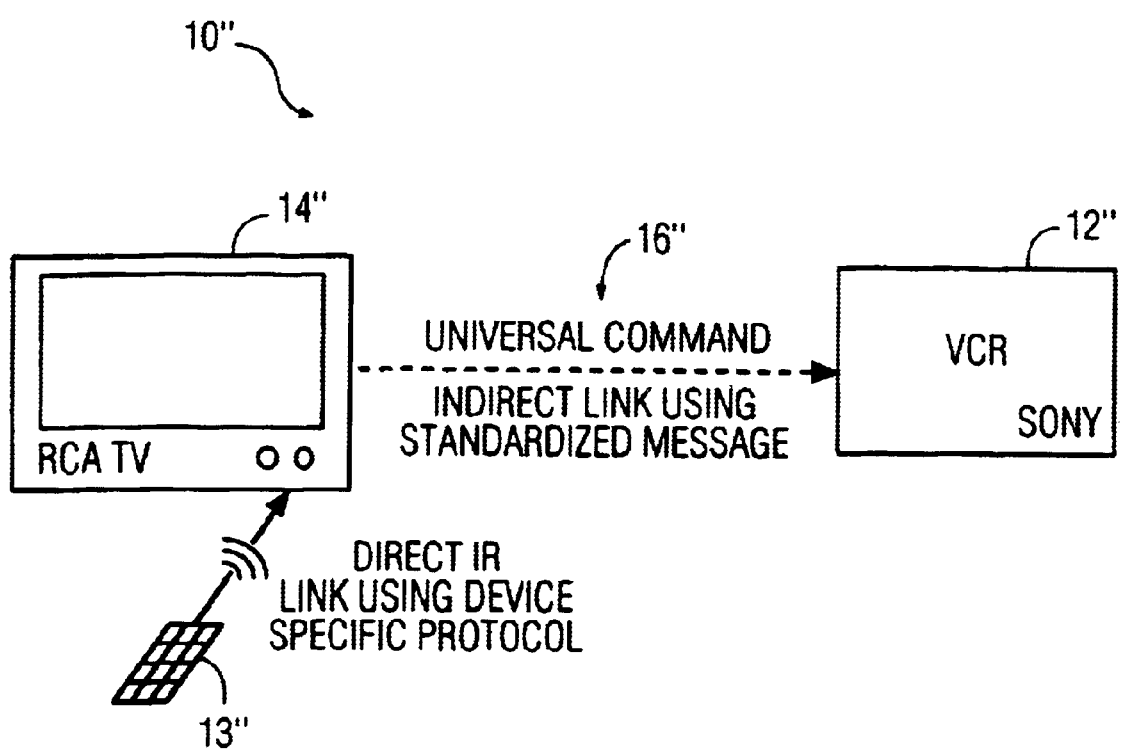
FIG. 4 shows, in simplified pictorial diagram form, a cluster of digital consumer electronic devices outlining the path of user initiated commands.

For example, in the situation of an RCA DTV 14" and a Sony DVCR 12", as illustrated in FIG. 4, a RC command from an RCA remote controller 13" is received over the IR link and thus will be in the RCA format. The RCA DTV 14" will translate that to the universal format and transfer it across the serial bus 16". The Sony DVCR 12" will receive the universal command and perhaps translate it into the Sony format and then take action. The translation of the commands can be thought of as translating from one language to another. As example of a RC key press would be "PLAY". This command is commonly available on many RC units, even though the format of the message is different from manufacturer to manufacturer.

Defined below are various methods to transfer an on-screen display menu from a peripheral device to a controlling device, for example a digital television.

To simplify the transfer of OSD information a "Pull" method to transfer the OSD information from the peripheral device to the controlling device may be used. With this method, the bulk of the OSD data is transferred from the peripheral to a display capable device by asynchronous read requests issued by the display capable device. That is, the controlling device reads the OSD information from the memory of the peripheral by making use of at least one block read transaction of IEEE 1394. The controlling device is informed of the location and size of the OSD data via a "trigger" command which is sent from the peripheral to the display device when the peripheral is ready to begin transferring data.

Since the OSD information on the peripheral device is updated in response to RC keypresses, the controlling device (or DTV) is alerted of the availability of newly updated data. This can be achieved by sending a short message (i.e., "trigger") to the OSD object of the controlling device. It should be noted that such a message needs to inform the display device of the starting location as well as length of the OSD data to be read. The length is necessary since the application in the controlling device is going to make use of asynchronous read transactions of IEEE 1394.

If the length is greater than what would fit into the maximum packet length possible for the particular IEEE 1394 network the controlling device may initiate multiple block read transactions until all the OSD information has been read. In addition to the starting location and length of the current OSD data to be transferred to a display device, a field indicating the type of OSD data is useful. This is especially useful since in this case the same mechanism can also be used to trigger the OSD mechanism of a display device to display such things as error, warning and/or status messages. The differentiation of the type of OSD data is helpful for the display device and/or user to decide whether it really wants it to be displayed (for example a user watching a movie may want to ignore things such as status messages).

An asynchronous push method primarily uses IEEE 1394 serial bus asynchronous write transactions initiated by the peripheral device to write the OSD data onto the controlling device. This approach allows a peripheral device to write its menu contents into a controlling device. Since it is expected that the menus will be larger than the MTU (Maximum Transfer Unit) of the bus, a fragmentation header can be added. The menu transport layer should add this header. On the receiving side, this layer reassembles the menu and passes it to higher layers.

An isochronous transport method provides for "broadcasting" the OSD data over one of the isochronous channels provided by IEEE 1394 serial bus. Bandwidth would need to be reserved and held as long as the peripheral device is being controlled using the OSD.

An asynchronous stream method uses an asynchronous stream to carry the OSD information. An asynchronous stream is essentially the same as an isochronous stream except that there is no bandwidth reservation and the stream is sent in the asynchronous portion of the bus cycle.

Navigation through the menu of the peripheral device is achieved by relaying all RC key presses over the IEEE 1394 serial bus in the form of universal commands to the peripheral device. This method of navigation is compatible with any method of OSD representation. Only minimal software is needed on both the peripheral and controlling devices. The controlling device only needs to have a well defined wav of sending key press information to the peripheral. Similarly the peripheral device only needs to be able to update the OSD information in a well defined manner. The OSD data does not need to contain any information to identify function and/or parameters. The peripheral device simply keeps track of incoming input in the form of keypresses and updates its OSD as it sees fit.

Figure 5:
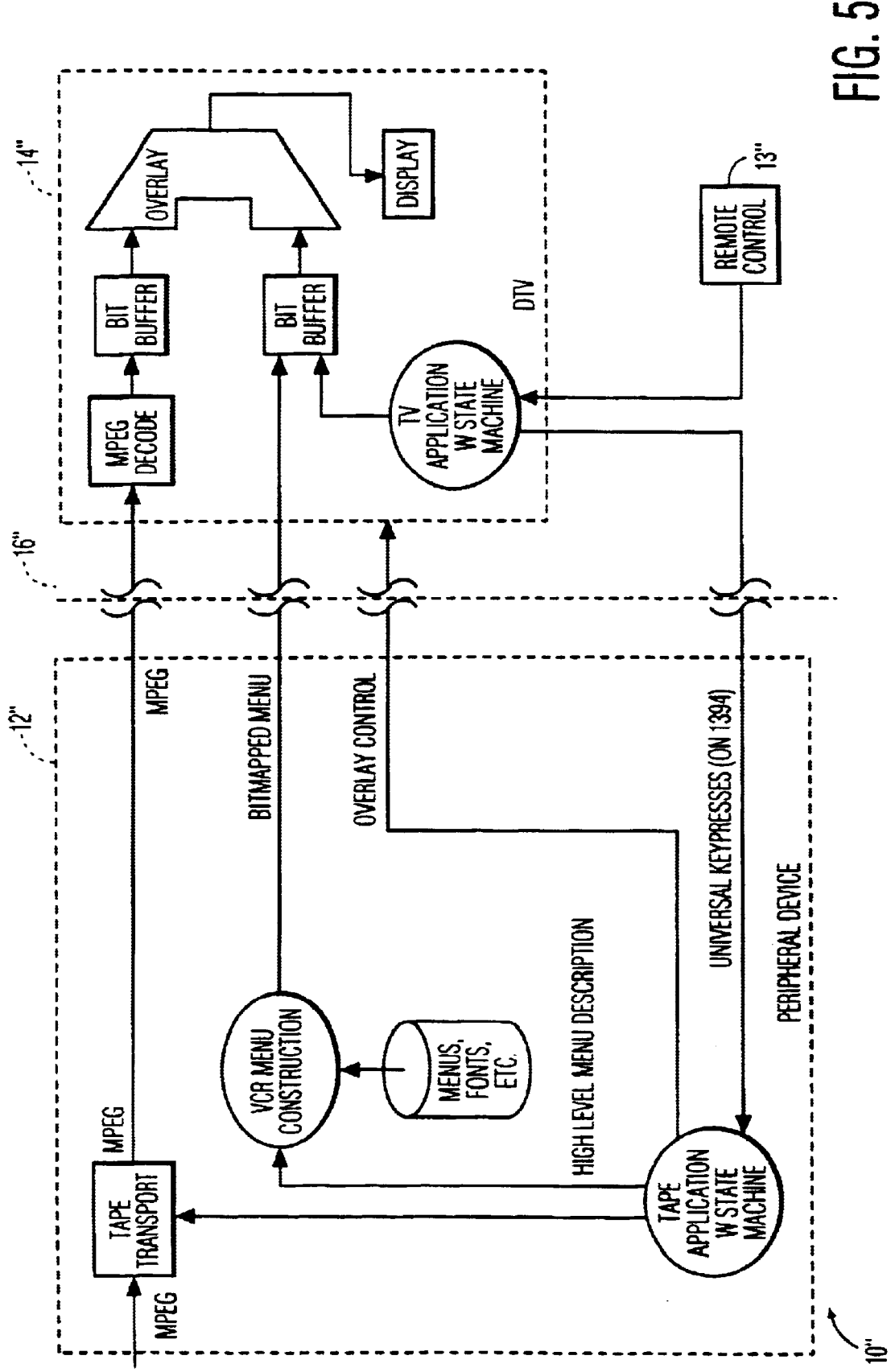

In an A/V cluster interconnected by an IEEE 1394 serial bus, it is possible to relay RC keypresses to the peripheral via the bus rather than through a direct link (e.g. IR) as illustrated in FIG. 5. This is possible by defining a standard message format which provides information about the RC key press to the peripheral device. With such a system 10", (1) one can relay RC commands from a remote controller 13" to devices which are not in direct line-of-sight (i.e. in another room etc.), and (2) the RC unit 13" associated with the controlling device (e.g., DTV) 14" can effectively act as a universal RC, (for example, even though the RCA brand remote controller for the RCA TV may not directly operate with the Sony VCR, the RCA TV can relay the RC keypresses via standardized messages over the IEEE 1394 serial bus to the VCR). Standard messages can be defined such that they can also relay full character sets in multiple languages according to the unicode standard (a subset of ISO 10646 as defined by the Unicode Consortium) besides being able to relay all possible special function keys found on a RC unit. This allows for relaying keypresses on an IR keyboard as well as RC.

Relaying remote control (RC) unit keypresses to the peripheral device is more completely defined below. However, such a method is extendible to devices such as computer keyboards, control panels, etc.

Control of a peripheral device (e.g., DVCR 12") may start by selecting that device as the source on the DTV 14". In this context, source selection refers to the controlling device acquiring all necessary parameters such that subsequent RC keypresses are relayed to the intended peripheral. Such parameters include the peripheral device's node_id, EUI, etc. and can be obtained from the registry table. The source selection operation can be initiated by the user clicking on an icon on a graphical user interface (GUI) of the controlling device or a RC key such as VCR1 on a RC unit. Source selection tags outgoing RC messages (such as, "channel up" and "channel down") as applying to the DVCR 12".

Once a peripheral device has been selected, all subsequent RC keypresses intended for the peripheral device are relayed to that peripheral's Universal Keyboard Input object. A typical format of the packet sent is shown below. The packet is sent to the peripheral device by making use of the asynchronous block write transaction of the IEEE 1394 SERIAL BUS bus.

| Universal IR Remote Message Encapsulation | | | |
| --- | --- | --- | --- |
| <-----1 byte-----> | <-----1 byte-----> | <-----1 byte-----> | <-----1 byte-----> |
| FCP CTS = 10h | ADPU = E8h | Univ. Context = 00h | Object ID = ??h |
| Method ID = 46h | IV ID = 66h Argument | Delimiter = F5 | Delimiter = F5 End of Command = F9h |
| ←←←←←←←←←← 1 Quadlet →→→→→→→→→→ | | | |

The variable 24 bit keypress_info is defined as follows:

| Universal IR Remote Message Format | |
| --- | --- |
| Code_type (8 bits) | Code_value (16 bits) |

The variable code_type defines the semantics of the next 16 bits contained in the code_value.

| Universal IR Remote Message Fields | |
| --- | --- |
| Code_type | Semantics of Code_value |
| $00_{16}$ | RC key_code as defined through standardization |
| $01_{16}$ | Unicode |
| other | reserved for future expansion |

The peripheral device receiving the RC key press information by its Universal Keyboard Input (UKI) software module carries out the corresponding action. Not all actions necessarily require the use of an OSD. An example is the PLAY command which is relayed to DVCR 12". It is sufficient that the playing action is initiated, no feedback to the user in the form of an OSD is required.

On the other hand, some control functions may take place through an OSD display mechanism. For such devices, after receiving the key press information through its UKI object, the OSD information is updated if necessary and the controlling device is sent a short message indicating the availability of updated OSD information (in the case of the Asynchronous Pull Method). Thus, the application on the controlling device can read the OSD information from the peripheral and display it.

It is important to note that an idle (not being controlled by anyone at that moment) peripheral device receiving a RC command through the indirect link needs a mechanism to avoid taking an action twice when it receives the same message via multiple paths. This can happen when the peripheral device is manufactured by the same company as the controlling device. In such a situation, it is possible that the peripheral device may receive the RC command as a universal RC message over the serial bus and may also receive the message via the direct IR link. Another possibility may be if a user is controlling a peripheral device over the serial bus from a remote location and another person is attempting to control the same peripheral device via a direct IR link using the associated remote controller. One way to do multipath resolution is for the peripheral to activate a timer upon reception of the RC commands through the indirect link. This timer is reset each time a new RC command is received through the indirect link. Any RC keypresses received over the direct link are ignored during the period this timer is active. The timer by definition becomes inactive after a period of inactivity and the device returns to its idle state where it responds to keypresses relayed either through the direct or the indirect link. In addition, once control is initiated through the indirect link by a particular node, the peripheral shall ignore any additional RC keypress messages coming from other nodes.

Further, it may be desirable to prevent general access to a device. In such a case, a special relationship called "locking" develops, for either a short or long duration of time, between two devices. Locking allows a device to control the access to some or all parts of the locked device. The controlling device is the "locking device" and the object of the locking relationship is the "locked device." The locking relationship allows a device to bind itself to another device.

There are various levels of locking desired. In many instances, an application requires only a device level locking. However, there are cases when it is desirable to lock at an object level. Once such situation is a VCR application where it could be desirable to lock the transport mechanism while allowing other devices to edit or add timer events. Likewise, although it is desirable to lock the display object in a TV to guarantee proper display, it is not desirable to lock the device's ability to respond to other communications.

The following locking scheme allows a device, context, or object to be treated as a network resource. The resource can be directly obtained or acquired from other devices residing on the network. There are two locking approaches discussed.

A request to lock the device is made directly, and the device must determine if it can accommodate the lock or if a previous lock takes precedence. If there is an impediment to making a new lock, a lock broker requests that previous impeding locks are dissolved. Once the previous locks are dissolved, the broker grants the locking request. The locked device must insure that all impeding locks are dissolved before it allows the new lock.

The second type of locking is resource locking. In resource locking, the locking device broadcasts a request that all devices dissolve locks that would prevent the new lock from occurring. Once sufficient time has passed to insure all previous conflicts are resolved, the device sets the lock.

During operation through the direct link, a peripheral device simply receives inputs from its RC unit or front panel and carries out corresponding actions. However, there is a slight complication when, as a result of these actions, an OSD is supposed to be generated on a display device. Since in this case, the actions of the peripheral were initiated through its own direct link, the peripheral has no knowledge as to which node on the network to display its OSD. Therefore a device which detects initiation of control through its direct link, can send messages to each OSD capable device. It is up to the display device to decide whether to act on this message or not. For example, if focus on that display device has been given to VCR1 and it receives an message from VCR1, it is quite natural for the display device to act on it. If the display device is not focused on the particular device, the user can be alerted of the presence of an OSD display request by a remote unit but can choose to ignore it depending on the data type in the received message. Since the actual control is through the direct link, it has absolutely no effect on the peripheral whether any or multiple display devices choose to display the OSD. On the other hand, this mechanism may also be used to inform the user of error conditions, warnings etc. which the user may or may not want to have displayed at the time. Therefore, the message includes a field for data type to indicate whether the OSD data presented to the display device is a warning message, error message, normal OSD data etc.

Similarly, a timer mechanism can be implemented for the direct link such that during the time it is active, any RC keypress information received through the indirect link is ignored.

All devices that are capable of using remote control commands must implement the Universal Keyboard Input software module. On the peripheral device, the receiver for the RC key press is implemented by, for example, a CAL object called "Universal Keyboard Input". This is a very simple object such that the CAL command sent to it is extremely simple, short and easy to parse. This simplicity is important since this level of interoperability should not require a full implementation control application language. The exact syntax which makes up the Functional Control Protocol (FCP) frame as defined ay IEC 61883 is shown (below). The syntax of the entire packet is consistent with the general framework/syntax of CAL. However, at this level of interoperability a device relaying RC keypresses can simply put together the packet below rather than implementing the full CAL mechanism.

A sample of some Universal Remote Key codes are defined below; further codes may be defined as needed.

| RC key | RC key_code |
| --- | --- |
| 0 | $0000_{16}$ |
| 1 | $0001_{16}$ |
| 2 | $0002_{16}$ |
| 3 | $0003_{16}$ |
| 4 | $0004_{16}$ |
| 5 | $0005_{16}$ |
| 6 | $0006_{16}$ |
| 7 | $0007_{16}$ |
| 8 | $0008_{16}$ |
| 9 | $0009_{16}$ |
| Power | $000A_{16}$ |
| VCR1 | $000B_{16}$ |
| VCR2 | $000C_{16}$ |
| DSS | $000D_{16}$ |
| Cable | $000E_{16}$ |
| Audio1 | $000F_{16}$ |
| Audio2 | $0010_{16}$ |
| TV1 | $0011_{16}$ |
| TV2 | $0012_{16}$ |
| Rewind | $0013_{16}$ |
| Fast Forward | $0014_{16}$ |
| Play Forward | $0015_{16}$ |
| Play Forward Fast | $0016_{16}$ |
| Play Forward Slow | $0017_{16}$ |
| Play Backward | $0018_{16}$ |
| Play Backward Fast | $0019_{16}$ |
| Play Backward Slow | $001A_{16}$ |
| Record | $001B_{16}$ |
| Pause | $001C_{16}$ |
| Stop | $001D_{16}$ |
| Mute | $001E_{16}$ |
| Up Arrow | $001F_{16}$ |
| Down Arrow | $0020_{16}$ |

-continued

| RC key | RC key_code |
|---|---|
| Left Arrow | $0021_{16}$ |
| Right Arrow | $0022_{16}$ |
| Reset | $0023_{16}$ |
| Menu | $0024_{16}$ |
| Sleep | $0025_{16}$ |
| Channel Up | $0026_{16}$ |
| Channel Down | $0027_{16}$ |
| Volume Up | $0028_{16}$ |
| Volume Down | $0029_{16}$ |
| Antenna | $003A_{16}$ |
| Enter | $003B_{16}$ |

Discover Process

The discovery process allows the controlling device to discover other devices in the network. This process is activated by a bus reset and serves to search and discover existing devices on the network. A bus reset may be caused by connecting/disconnecting a device, software initiated reset etc. This software module relies on some information stored on each device configuration ROM. This information is referred to as Self Description Device Table (SDDT) and contains information such as Model #, Location of menu, URL, EUI Vendor ID etc.

The SDDT of the controlling or display device contains a pointer to an information block which contains information about the display capabilities of the device. The information block may include type of display (interlaced or progressive), maximum bytes per line, resolution modes supported (full, ½, ⅓), mix weights supported, maximum bits/pixel supported for palette mode (2, 4, 8) and maximum block size supported other methods of discovery can also be used to obtain this information such as, the Home Plug and Play defined for CAL or the subunit descriptors defined for AV/C.

After the bus initialization is complete, the discovery manager of the controlling device reads the SDDT located in the ROM of each connected device. This information is built into a registry table. Each device on the IEEE 1394 serial bus will have a registry table which will be used to keep track of other devices on the bus and their capabilities. For all devices on the bus, this registry table (or registry) will be updated during the discovery process. The registry provides services to the application for mapping volatile characteristics(e.g., 1394 node_ID, IP address etc.) a non-volatile 64-bit EUI (Extended Unique Identifier) for identifying any node on 1394 bus.

The registry table is maintained by the registry manager within each device and contains the information for each node to provide the service previously specified. This registry table is constantly updated by the discovery manager on bus resets. An example of the construction of such a registry Table follows:

| 64-bit EUI | 1394 node_ID | IP address | Manufac/ Model # | Device Type |
|---|---|---|---|---|

The fields of the registry table are defined as:

64-bit EUI is a 64-bit number that uniquely identifies a node among all the Serial Bus nodes manufactured world-wide.

| node_vendor_id | chip_id_hi |
|---|---|
| chip_id_lo | |

←←←←←←←←← 1 quadlet = 32 bits →→→→→→→→→→

1394 node_ID is a 16-bit number that uniquely identifies a Serial bus node within a IEEE 1394 SERIAL BUS subnet. The most significant 10 bits are the bus ID and the least significant bits are the physical ID. Bus ID uniquely identifies a particular bus within a group of bridged buses. Physical ID is dynamically assigned during the self-identification process.

IP address is a 32-bit private IP address assigned dynamically.

Manufacturer/Model # is obtained from the device's SDDT and is used to inform the customer of possibilities for selecting a source.

Device Type is also obtained from the device's SDDT and is used to inform the customer of possibilities for selecting a source. This field may also be useful in determining what stream format should be used. For example, a game machine may not use MPEG 2 as an output format.

The registry can be used to determine the IEEE 1394 serial bus address for any node on the home network based on the 64-bit EUI of that node. Correlation to a stable identifier such as the EUI is important since node addresses can change during a bus reset.

On each of the CE devices, some setup occurs at installation time (through the use of the Device Setup Manager) as described above for mapping other devices on the cluster to output or input channels of that devices. This does not necessarily mean that IEEE 1394 isochronous channels are allocated at this time. Another possibility is that each device merely loads a selection menu with devices found on the network by looking at the SDDT. Interaction can start by first addressing the display device (assumed to be digital in this example) and selecting the device that the user desires to control (e.g., digital VCR). When this happens, an isochronous channel is set up between the DVHS and the display device.

Many remote controls have special functions which only have meaning for the peripheral device. These special functions may not be integrated on the RC associated with the controlling (e.g., DTV) device. Thus the function of these keys can be made available on a menu from the peripheral.

Further, the present invention permits the control of non-video devices by using a graphical user interface. As stated earlier, the display device (i.e., DTV) would be a good choice for a controlling device since it will almost always be present on the cluster. A non-video device would provide menus in the same way as video devices (described above). However, the device would need to store its own menus.

In some cases, it is better to have coordinated control of several devices at once. For example, this may be useful in the case of dubbing. This coordination is difficult to do using only commands which map to an IR remote control. Additionally, it will be desirable to have the capability to control some CE devices from a PC. This is where a full control language with device models such as CAL or AV/C could be useful.

While the invention has been described in detail with respect to numerous embodiments thereof, it will be apparent that upon a reading and understanding of the foregoing, numerous alterations to the described embodiment will occur to those skilled in the art and it is intended to include such alterations within the scope of the appended claims.

What is claimed:

1. A digital television apparatus comprising:
   (a) means for communicating via a digital bus with a peripheral device;
   (b) means for receiving, from a data entry means associated with said digital television apparatus, a user initiated command associated with controlling said peripheral device, said user initiated command being recognized by said digital television apparatus and comprising header information and control information for controlling an operating mode of said peripheral device;
   (c) means for mapping said control information into a universal command capable of being interpreted by said peripheral device, said peripheral device not being responsive to said user initiated command; and
   (d) means for transferring said mapped control information over said digital bus to said peripheral device.

2. The digital television apparatus of claim 1 further comprising:
   (a) means for receiving, from said peripheral device, menu data associated with an on-screen display of said peripheral device; and
   (b) means, coupled to said receiving means, for displaying said menu data.

3. The digital television apparatus of claim 2 and further comprising:
   means for updating a portion of said on-screen display in response to said menu data.

4. The digital television apparatus of claim 2 wherein said menu data defines user selectable functions associated with said peripheral device.

5. The digital television apparatus of claim 4 wherein said peripheral device is a non-video device.

6. The digital television apparatus of claim 1, wherein said mapping means appends code type data to said universal command, said code type data indicating to said peripheral device that a received code is in a universal command format.

7. A method for controlling a peripheral electronic device interconnected via a IEEE 1394 serial bus to a digital television apparatus, said method comprising:
   (a) determining, in response to a bus reset, said peripheral electronic device interconnected via said serial bus;
   (b) communicating via said serial bus with said peripheral electronic device;
   (c) receiving, from a data entry means associated with said digital television apparatus, a user initiated command associated with controlling said peripheral electronic device, said command having a format recognized by said digital television apparatus and comprising control information for controlling an operating mode of said peripheral electronic device;
   (d) mapping said control information into a universal command format capable of being interpreted by said peripheral electronic device, said peripheral electronic device not being responsive to said command; and
   (e) transferring said mapped control information over said serial bus to said peripheral electronic device.

8. The method of claim 6, wherein the mapping step further comprises appending code type data to said mapped control information, said code type data indicating to said peripheral electronic device that a received code is in said universal command format.

9. A method for controlling a peripheral consumer electronic device interconnected via an IEEE 1394 serial bus to a digital television comprises:
   (a) receiving, via said serial bus, a control signal from said digital television, said control signal being translated from a format only recognized by said digital television; and
   (b) initiating a timer to generate a time period in response to said control signal received via said serial bus, said peripheral device only responding to additional commands received via said serial bus during said time period.

10. The method of claim 9 wherein said peripheral device is selected from a menu associated with said digital television, said menu listing the available peripheral devices.

11. The method of claim 8 wherein said peripheral device receives said control signal via a direct link, said peripheral device performs the step of:
    (a) sending a message to said digital television, said message indicating the availability of digital data associated with an on-screen display of said peripheral device;
    (b) receiving an acknowledgment from said controlling device; and
    (c) transporting said digital data over said serial bus to said digital television.

12. The method of claim 11 wherein said step of initiating a timer comprises:
    initiating a timer to generate a time period in response to said control signal received via said direct link, said peripheral device only responding to additional commands received via said direct link during said time period.

* * * * *

UNITED STATES PATENT AND TRADEMARK OFFICE
CERTIFICATE OF CORRECTION

PATENT NO. : 6,665,020 B1
DATED : December 16, 2003
INVENTOR(S) : Thomas Anthony Stahl et al.

It is certified that error appears in the above-identified patent and that said Letters Patent is hereby corrected as shown below:

<u>Title page,</u>
Item [75], Inventor, please correct the spelling of the inventor's name from "Saban Kuragay" to -- Saban Kurucay --.

Signed and Sealed this

Thirteenth Day of July, 2004

JON W. DUDAS
*Acting Director of the United States Patent and Trademark Office*